(12) United States Patent
Gagneux et al.

(10) Patent No.: US 7,661,272 B2
(45) Date of Patent: Feb. 16, 2010

(54) TURBOFAN JET ENGINE WITH AN ANCILLARY-CONNECTING ARM, AND THE ANCILLARY-CONNECTING ARM

(75) Inventors: Pierre Gagneux, Chailly En Biere (FR); Lionel Jean Leon Lefranc, Combs la Ville (FR); Johnny Letache, Chaumes En Brie (FR); Joseph Taglialavore, Dammarie les Lys (FR)

(73) Assignee: Snecma, Paris (FR)

( * ) Notice: Subject to any disclaimer, the term of this patent is extended or adjusted under 35 U.S.C. 154(b) by 471 days.

(21) Appl. No.: 11/226,384

(22) Filed: Sep. 15, 2005

(65) Prior Publication Data
US 2007/0234706 A1 Oct. 11, 2007

(30) Foreign Application Priority Data
Sep. 27, 2004 (FR) .................................. 04 52174

(51) Int. Cl.
*F02K 3/02* (2006.01)
(52) U.S. Cl. ....................................................... 60/796
(58) Field of Classification Search ................ 60/226.1, 60/796, 296, 298, 802, 415; 415/191, 208.2, 415/210.1, 211.2
See application file for complete search history.

(56) References Cited

U.S. PATENT DOCUMENTS

| 4,183,211 | A | * | 1/1980 | Menioux ...................... 60/224 |
| 4,618,419 | A | * | 10/1986 | Hollinshead et al. ... 210/167.01 |
| 4,972,671 | A | | 11/1990 | Asselin et al. |
| 4,987,736 | A | | 1/1991 | Ciokajlo et al. |
| 5,174,110 | A | * | 12/1992 | Duesler et al. ............. 60/226.1 |
| 5,746,574 | A | | 5/1998 | Czachor et al. |
| 5,771,969 | A | * | 6/1998 | Garay ........................ 166/211 |
| 6,974,089 | B2 | * | 12/2005 | Neumaier et al. ............. 239/88 |
| 2005/0022501 | A1 | * | 2/2005 | Eleftheriou et al. ........ 60/226.1 |

FOREIGN PATENT DOCUMENTS

| EP | 0 601 864 A1 | 6/1994 |
| EP | 1 149 986 A2 | 10/2001 |
| FR | 2 631 386 | 11/1989 |

\* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

A turbofan jet engine includes an external easing, connected by radial arms to an annular internal device, downstream of which is mounted, opposite to the external casing, a shell forming a fairing, ancillaries on the outside of the external casing, and ancillaries on the inside of the shell. The turbofan jet engine further includes at least one monoblock arm for the connection of ancillaries between the outside of the external casing and the inside of the shell, placed parallel to a radial arm.

8 Claims, 4 Drawing Sheets

TURBOFAN JET ENGINE WITH AN ANCILLARY-CONNECTING ARM, AND THE ANCILLARY-CONNECTING ARM

BACKGROUND OF THE INVENTION

1. Field of the Invention

The invention concerns a turbofan jet engine with a connection for ancillaries.

2. Discussion of the Background

Functionally, a turbofan jet engine includes, a fan, a compressor, a combustion chamber, a turbine and an exhaust nozzle. These various elements are contained inside casings.

All of these casings form an external shell, whose interior is defined as the core of the turbofan jet engine. Certain fluids necessary for the operation of the turbofan jet engine, such as the fuel and the oil, have to be brought in from the outside of the engine to its core. These fluids are used in particular to feed the combustion chamber with fuel, the various elements of the engine with lubrication oil, and likewise for the discharge valve actuators, the variable setting of the compressor, control of the play of the high pressure and low pressure turbine housings, and so on. Routing of the fluids is effected via pipes which are grouped under the title of ancillaries.

Downstream of the fan-blade retention casing, a turbofan jet engine includes a casing, called the intermediate casing, by which the front suspension of the engine is generally fixed to an aircraft. The intermediate casing includes an external casing, within which an annular structural device is located concentrically, the two being connected by radial arms, some of which are structural. Downstream of the annular structural device, opposite to the downstream portion of the external casing, is placed a shell forming a fairing. Certain ancillaries have to be routed from the outside of the external casing into the core of the turbofan jet engine, on the inside of the shell. This routing is generally along a structural radial arm of the intermediate casing, with the ancillaries entering into the core of the engine 1 at the level of the shell.

SUMMARY OF THE INVENTION

The invention particularly concerns the passage of the ancillaries along a structural radial arm of the intermediate casing of the engine, but the applicant does not mean to limit the scope of the patent rights to this single application. More generally, the invention concerns the passage of ancillaries along a radial arm between an external casing and an annular internal device.

Patent application FR 04 00 222 describes a support fitted to the shell to take these ancillaries, including an external carrier plate to accommodate the ancillaries, and an internal carrier plate for distribution of the ancillaries, where the ancillaries coming from the external casing of the intermediate casing are inserted via special ferrules at their internal end, including an annular gasket, into channels of the external carrier plate, which emerge into the core of the turbofan jet engine through orifices in the internal carrier plate, where the ancillary connections are attached to which the ancillaries of the core of the turbofan jet engine are connected.

Although it is compact, the above solution necessitates connection of the ancillaries one by one in the respective channels of the receiving carrier plate, a process which is tedious and takes time on the engine assembly lines.

This present invention aims to remedy this drawback.

To this end, the invention concerns a turbofan jet engine that includes an external casing connected by radial arms to an annular internal device, downstream of which is mounted, opposite to the external casing, a shell forming a fairing, ancillaries on the outside of the external casing, and ancillaries on the inside of the shell, characterised by the fact that it includes at least one ancillary-connecting arm between the outside of the external casing and the inside of the shell, placed parallel to a radial arm.

The description of an element as "monoblock" means that the element includes a part, or a set of parts that are attached together, mounted on or removed from the engine in a single block. By means of the invention, the ancillary-connecting arm, which is monoblock, allows direct connection from the outside of the external casing to the inside of the shell, eliminating the need to make individual connections of ancillaries between the two, since the arm is mounted as a block. The saving of time on the engine assembly line is therefore considerable.

Preferably, the monoblock arm includes ancillary connections between the external casing and the shell, a block for passage of the ancillary connections through the external casing, and an ancillary-connection distribution box.

In the aeronautical area, resistance to fire is a dominant criterion. Thus, advantageously, the ancillary-connection distribution box is also fire-resistant.

The invention also concerns an ancillary-connection arm for the above turbofan jet engine, including ancillary connections between the external casing and the shell, a block for passage of the ancillary connections through the external casing, and an ancillary-connection distribution box.

BRIEF DESCRIPTION OF THE DRAWINGS

The invention will be understood better with the help of the following description of the preferred form of implementation of the turbofan jet engine of the invention, with reference to the appended figures, in which.

DETAILED DESCRIPTION OF THE PREFERRED EMBODIMENTS

Figure 1:
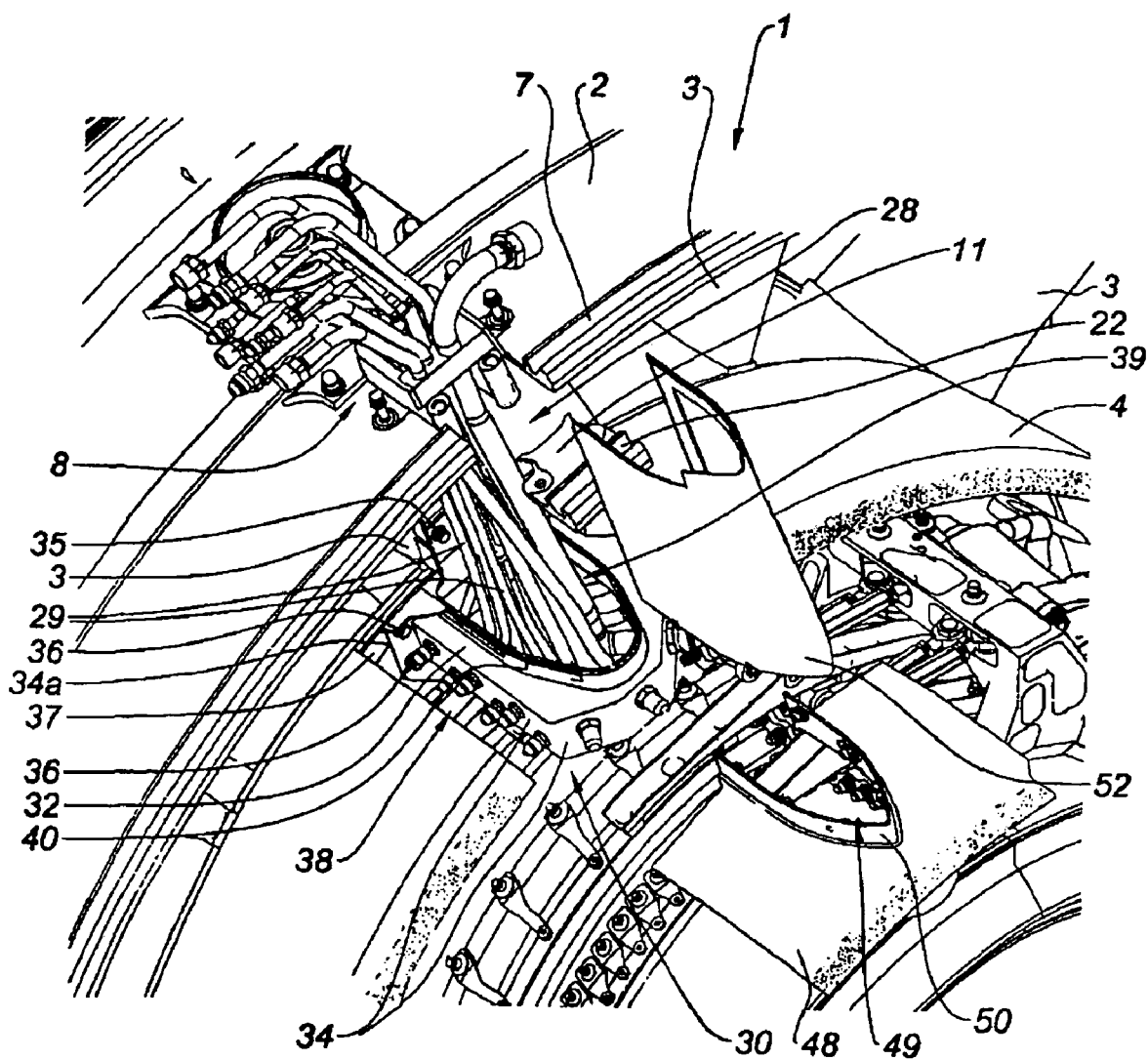
FIG. 1 is an exploded partial perspective view of the turbofan jet engine of the invention, at the level of its intermediate casing.

Referring to FIG. 1, the turbofan jet engine 1 of the invention, built around an axis in a manner which is very familiar, includes, downstream of the fan-blade retention casing, mounted around its axis, an intermediate casing, to which the front suspension of the engine 1 of an aircraft is generally fixed. The intermediate casing includes an external casing 2, an annular internal device 37, which here is structural, concentric with the external casing 2, these two elements being connected by radial arms 3, some of which are structural. At the foot of the radial arms 3 is mounted, on the internal annular device 37 and on the downstream side, a shell 4 forming a fairing, opposite to the external casing of the intermediate casing 2.

The invention particularly concerns the connection of ancillaries along a structural radial arm 3 of the intermediate casing 2, from the outside of the external casing of the intermediate casing 2 to the inside of the shell 4, that is into the core of the engine 1 at the level of the shell 4, by means of a monoblock ancillary-connecting arm 28.

The monoblock arm 28 includes a block 8 for the passage of ancillary connections through the external casing of the intermediate casing 2, ancillary connections 29, and a box 30 for the distribution of ancillary connections 29 at the level of the shell 4. These various elements are attached to each other and form a block, explaining the use of "monoblock" to describe the arm 28. The arm 28 can thus be fitted to or removed from the turbofan jet engine 1 as a block, between the external casing of the intermediate casing and the shell 4, as will be seen later.

Figure 2:
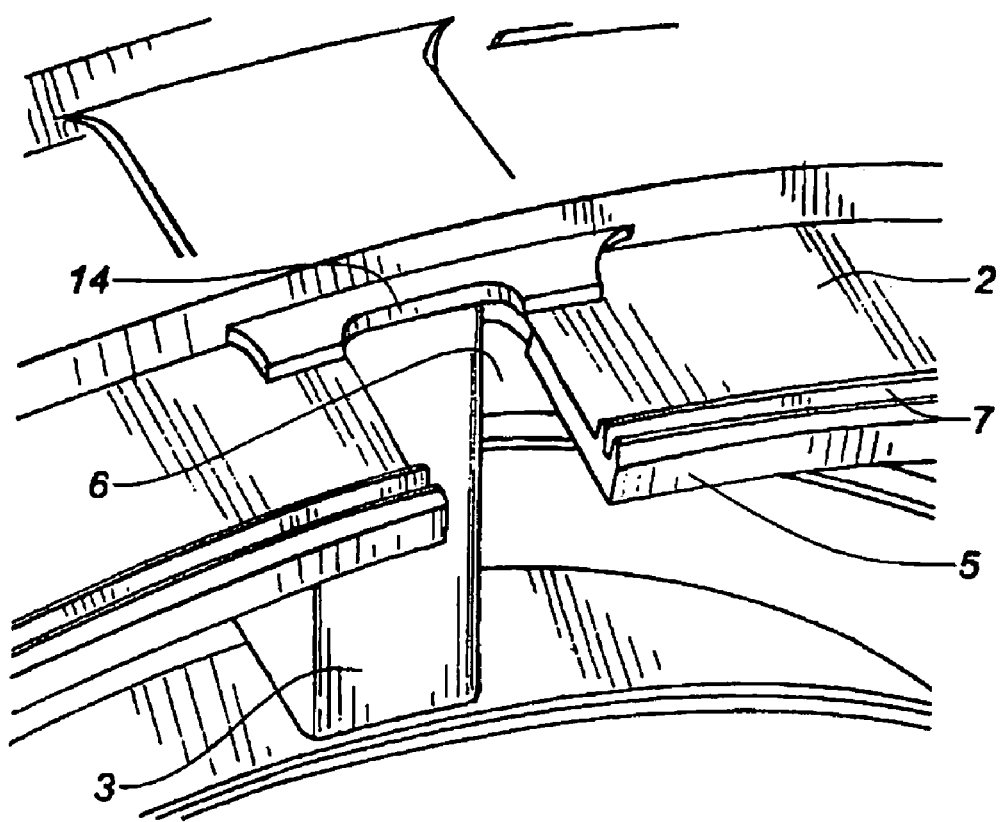
FIG. 2 is a partial perspective schematic view of the intermediate casing of the turbofan jet engine of the invention.

With reference to FIG. 2, the external casing of the intermediate casing 2 is pierced, opposite to the shell 4, at its downstream edge 5, with a longitudinal cut-out 6 of generally rectangular shape. Along the circumference of its downstream edge 5, the external casing 2 includes a gutter channel 7 on the outside, on the circumference of its downstream edge 5.

Figure 5:
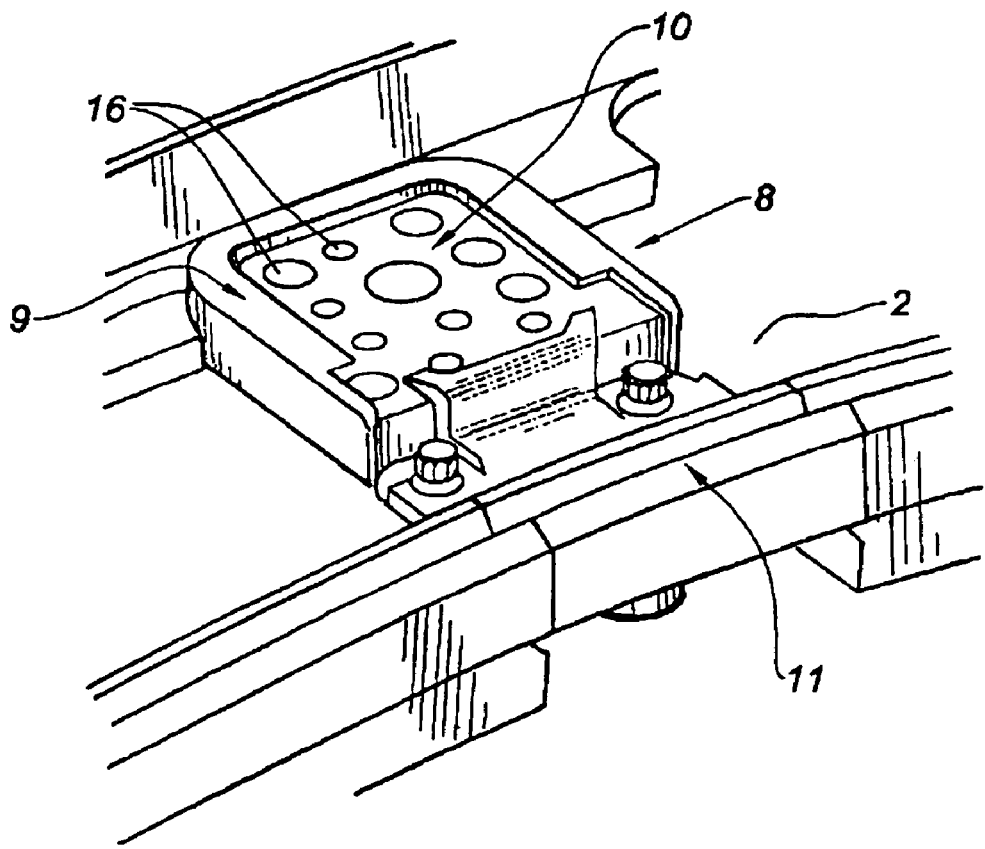
FIG. 5 is a partial perspective schematic view of the intermediate casing, with the ancillary-connection passage block of the monoblock arm and the gasket channel of the turbofan jet engine of the invention.

Referring to FIG. 5, where the ancillary-connecting block 8 has been shown alone on the external casing 2, without the other elements of the monoblock arm 28, the cut-out 6 is arranged to receive the ancillary-connection passage block 8, including a securing bracket 9 supporting a gasket 10 for guidance and securing of the ancillary connections 29. When the block 8 has been mounted on the external casing 2, a part 11, which will be called the gasket support sector 11, is fixed onto it and the external casing 2. The bracket 9 and the gasket support sector 11 are formed by casting. The function of the ancillary-connection passage block 8 is to guide and secure the ancillary connections 29, so as to create a monoblock arm 28 that is standardised and of small size.

In the remainder of the description, the various parts of the engine of the invention will be described in terms of the reference system of the engine. Thus, when the parts are shown in a figure, not mounted on the engine, their various sections will be referenced according to their positioning when mounted. This is in the reference system of the engine, in particular referred to its axis, including the various adjectives such as internal, external, radial, axial, longitudinal, upstream, downstream, etc.

Figure 3:
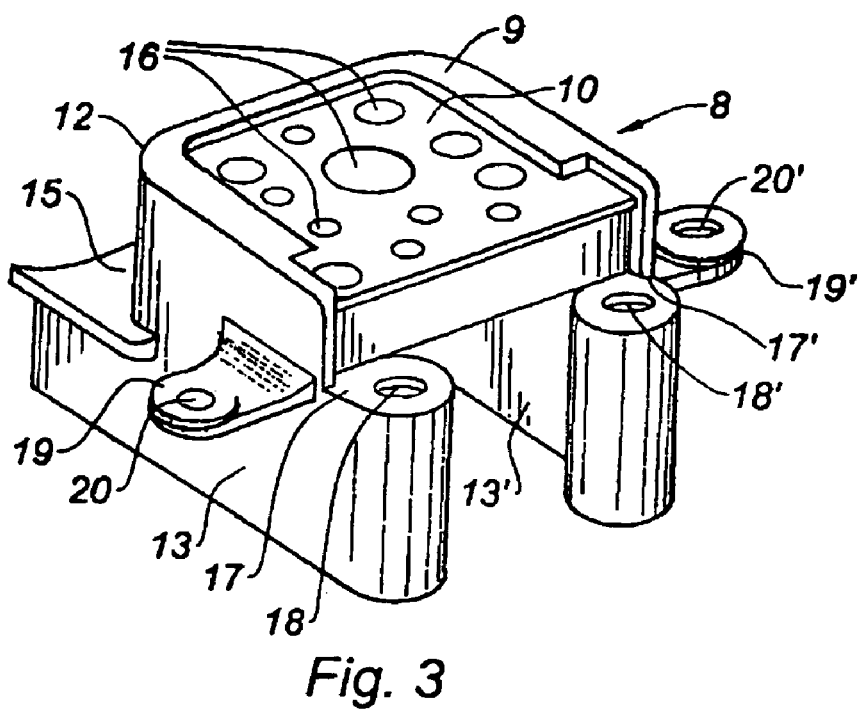
FIG. 3 is a perspective schematic view of the ancillary-connection passage block of the monoblock arm of the turbofan jet engine of the invention.

With reference to FIG. 3, the bracket 9 of the ancillary-connection passage block 8 of the monoblock arm 28 generally comes in the form of a metal yoke, consisting of a base 12 and two branches 13, 13', curving slightly inwards to match the shape of the external casing 2. The base 12 of the bracket 9 is designed to rest against the upstream end 14 of the cut-out 6 in the external casing 2. It includes a longitudinal shoulder 15 whose longitudinal projecting part is on the inside end of the base 12. The shoulder 15 is shaped to rest against the inside surface of the external casing 2, upstream of the cut-out 6.

Between the branches 13, 13' of the bracket 9, at its outer end, is mounted the gasket 10, here of an elastomer material, whose external surface is at a slightly more internal level than that of the external surface of the bracket 9. The elastomer gasket 10 is pierced with a variety of radial channels 16 for the passage of ancillary connections 29.

At its downstream end, the bracket 9 includes, at the level of each of its branches 13, 13', a longitudinal shoulder 17, 17', located at a distance from the external surface of the bracket 9, that is smaller than that of the opposite shoulder 15 and which corresponds to the thickness of the gasket 10. On each shoulder 17, 17' is pierced, through the corresponding branch 13, 13', a radial bore 18, 18' to receive a screw. Upstream of the shoulders 17, 17', two lugs 19, 19' project from the lateral faces of the branches 13, 13'. Each lug is pierced with a radial bore 20, 20'.

Figure 4:
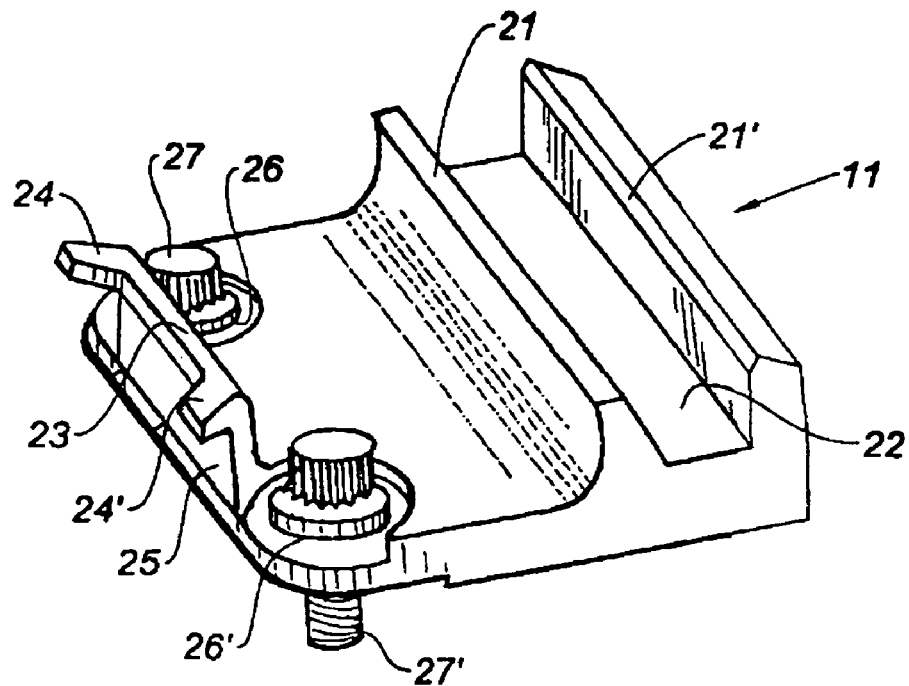
FIG. 4 is a perspective schematic view of the gasket channel of the turbofan jet engine of the invention.

With reference to FIG. 4, the gasket support sector 11 takes the form of a metal plate. On its downstream edge, it has two radial projections 21, 21' forming a gutter channel 22, designed to provide continuity for the gutter channel 7 of the external casing 2.

On its upstream edge, the gasket support sector 11 has a central radial projection 23 that includes at its outer end two longitudinal fingers 24, 24', extending upstream, positioned at each side of the projection 23. The upstream face 25 of the projection 23 and its fingers 24, 24' are designed to rest against the downstream face and the outer face, respectively, of the elastomer gasket 10.

The gasket support sector 11 also has, on its upstream edge, on either side of the central projection 23, two radial bores 26, 26' to receive a screw 27, 27', respectively, separated from each other by the same distance as the bores 18, 18' of the branches 13, 13' of the bracket 9.

The channels 16 of the gasket 10 are arranged to receive the ancillary connections 29 of the monoblock arm 28. These channels 16 are thus drilled according to the ancillary connections 29 that they are intended to convey. In the event, the channels 16 visible on FIGS. 3 and 5, in which the gasket 10 has been shown without the ancillary connections that it is intended to guide and secure, are not arranged in the same way as those of FIGS. 1 and 8, which receive ancillary connections 29, in order to illustrate the modulable aspect of the gasket 10 and therefore of the monoblock arm 28.

Figure 8:
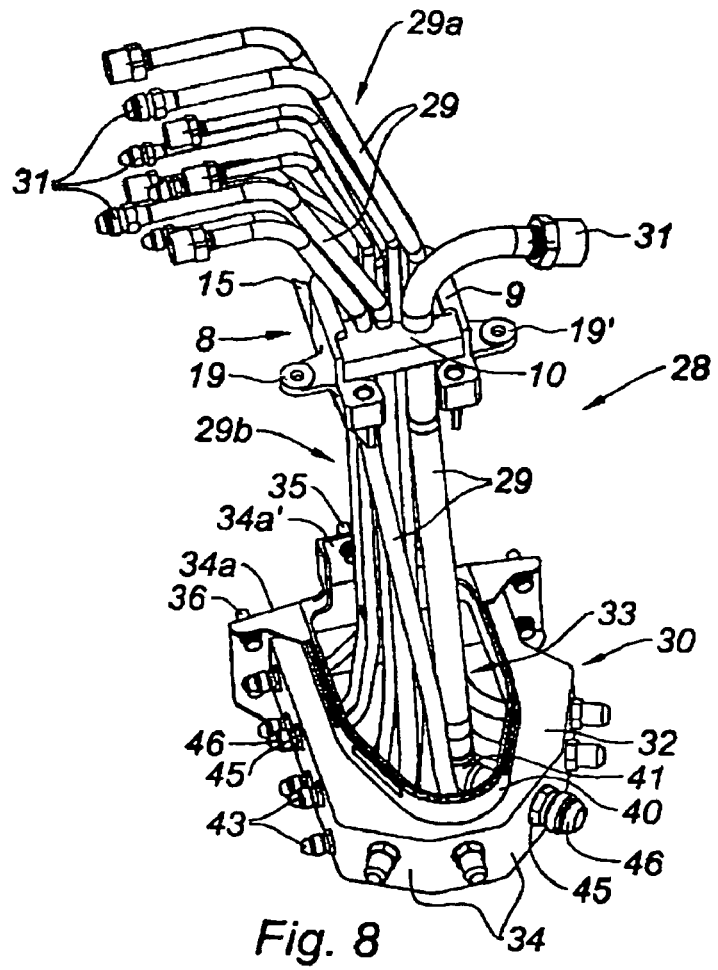
FIG. 8 is a perspective schematic view of the monoblock arm of the turbofan jet engine of the invention.

With reference to FIG. 8, the ancillary connections 29 of the monoblock arm 28 are inserted into their respective channels 16 in the gasket 10, which were previously dimensioned to this end. They include a portion 29a projecting from the outer end of the gasket 10, to be called the external portion 29a, and a portion 29b extending radially between the ancillary-connection passage block 8 and the ancillary-connection distribution box 30, to be called the internal portion 29b.

Each ancillary connection 29 is intended to connect one ancillary located on the outside of the external casing 2 to one ancillary located on the inside of the shell 4. Each ancillary connection 29 therefore has characteristics (section, material, etc.) that suit the characteristics of the ancillaries for which it is providing this connecting function. The harness of ancillary connections 29 of the monoblock arm 28, just like the channels 16 of the gasket 10 holding them, and, as will be seen, the distribution box 30, are thus dimensioned beforehand according to the ancillaries that are to pass parallel to the radial arm 3 of the intermediate casing, in the monoblock arm 28 which, when all of its elements are attached to each other, will be mounted on the engine 1 on the assembly line of the latter.

The end of the external portion 29a of each ancillary connection 29 includes a ferrule 31 designed to be connected to the ancillary, which includes a complementary ferrule, that the connection 29 is designed to connect. The external portion 29a of the ancillary connections 29 can be bent if necessary, with a welded elbow between each two portions of pipe, or a pipe of one part bent in order to be suitably conducted to the ancillary to be connected. The ancillary connections 29 extend radially to the inside, from the passage block 8, to the ancillary-connection distribution box 30.

Figure 6:
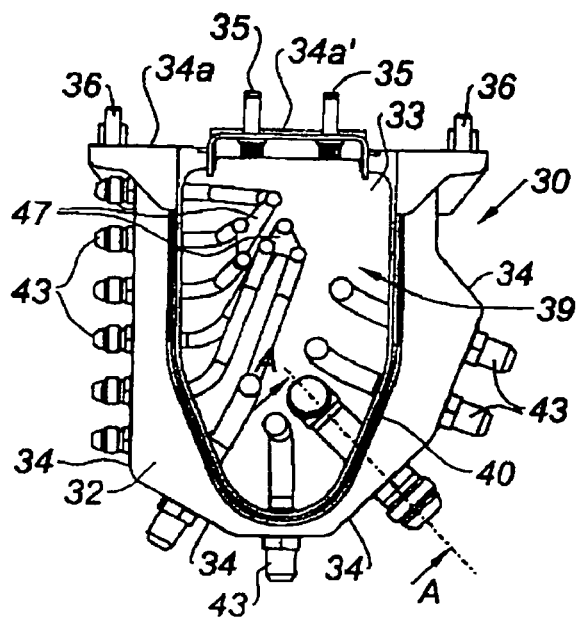
FIG. 6 is a schematic plan view of the distribution box of the monoblock arm of the turbofan jet engine of the invention.
Figure 7:
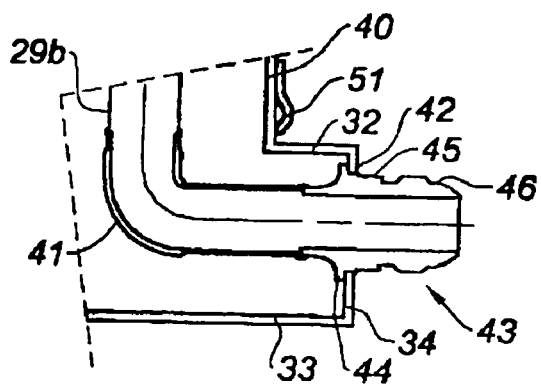
FIG. 7 is a view in section of the box of FIG. 6 at plane A-A.

Referring to FIG. 6, here this box 30 is formed from a steel plate, in the event with a thickness of 2 mm. It can be formed by casting or by continuous welding of steel plates, in order to present good resistance to fire. It takes the form of a hollow box, of hexagonal shape, with some curved parts. It therefore includes a hexagonal outer wall 32, a hexagonal inner wall 33 with the same outline as the outer wall 32, and lateral walls 34, here meaning "lateral" relative to the box, possibly curved, extending between the internal 33 and external 32 faces. One of these walls 34, located on the upstream side, runs transversally to the axis of the engine 1, and this will henceforth be called the upstream wall 34a. The external 32 and internal 33 faces can be curved to follow the shape of the shell 4.

The outer wall 32 is pierced over most of its surface with a cut-out 39 for the passage of ancillary connections 29. Here, this cut-out 39 includes an upstream edge extending more or less transversally to the axis of the engine 1, with the same dimension as the transverse dimension of the radial arm 3, from which extend two longitudinal edges which are rounded downstream so that they meet, providing the cut-out 39 with a semi-oval shape. The cut-out 39 is bordered by a shoulder 40 extending as a projection to the outside of the outer wall 32 of the box 30.

With reference to FIG. 1, the shell 4 includes a cut-out 38 in which the box 30 is mounted, with the outer face of its outer wall 32 placed just below the level of the shell 4. From the upstream wall 34a, there extends, parallel to it, in a central position and toward the outside, a fixing wall 34a', designed to be fixed to the radial arm 3 by means of a screw 35. For its part, the upstream wall 34a is designed to receive screws 36 that are intended to be attached to the internal annular device 37 supporting the shell 4.

The internal portion 29b of each ancillary connection 29 includes a rectilinear portion extending radially from the ancillary-connection passage block 8 and the box 30. At the level of the shoulder 40 of the box, the internal portion 29b includes an elbow 41 after which the ancillary connection 29 extend parallel to the inside surface 33 of the box 30, in the direction of a lateral wall 34 through which it feeds out via a nipple 43 which is attached to it. The ancillary connection 29 can be formed from a single part with its elbow 41, or can consist of two pieces of rectilinear piping on either side of the elbow 41, to which they are welded by continuous welding.

Each ancillary 29 thus includes, at its inner end, a nipple 43, metal in this case. The lateral walls 34 of the box 30 include a series of cut-outs 42 to receive the nipples 43. Each nipple 43 includes a collar 44, a nut 45 and a ferrule 46 for connection to an ancillary with a complementary ferrule. The collar 44 is butted up against the wall surrounding the cut-out 42 to receive the nipple 43, on the inside of the box 30, with the nut 45 being tightened on the outside (a counter-spanner can typically be used on the inside of the box in order to execute the operation of tightening the nut 45). The ferrule 46 of the nipple 43 thus projects outside of the box 30.

Over and above the securing of the nipple 43 by means of the nut 45, the collar 44 is welded or brazed onto the wall surrounding the cut-out 42 by a continuous welding process. This welding performs two functions, the first being additional securing of the nipple 43 to the box 30, replacing a locknut, and the second providing fire-resistant protection for the inside of the box 30. The sealing of the box 30 against fire is thus very considerable, providing a high degree of fire resistance, this being a very important requirement in the aeronautical area in particular.

The internal parts 29b of the ancillary connections 29 can be attached together if appropriate, in groups of three for example, using rigid plates 47, in order to reduce vibration of the ancillary connections 29.

The monoblock arm 28 thus includes the ancillary passage block 8, the box 30, and the ancillary connections 29, with their external portion 29a for connection to an ancillary located on the outside of the external casing 2 and their internal portion 29b emerging the level of the nipples 43 of the box, to which ancillaries located on the inside of the shell 4 can be connected. The whole assembly is welded and therefore fixed, thus providing this arm 28 with the characteristic of a monoblock. The number of ancillary connections 29, their characteristics, and consequently the number of channels 16 of the elastomer gasket 10 and their diameter, the number of bores 42 in the box and their diameter, as well as the nipples 43 intended to be welded to it, are determined in according with the ancillaries for which one desires to provide continuity between the outside of the external casing 2 and the inside of the shell 4. Each monoblock arm 28 is therefore standardised according to its position and to the turbofan jet engine 1 on which it is intended to be mounted.

The mounting of the monoblock arm 28 on the engine 1 will now be described in greater detail.

The monoblock arm 28 is first assembled, with all of its elements as they have been described above, namely the ancillary-connection passage block 8, the ancillary connections 29, the nipples 43 and the box 30. This monoblock assembly is then mounted on the engine 1, with the ancillary-connection passage block 8 being mounted in the cut-out 6 in the external casing of the intermediate casing 2, while the box is fixed to the bracket 37 supporting the shell 4.

Mounting of the bracket 9 of the ancillary-connection passage block 8, on which the elastomer gasket 10 is fitted, in the cut-out 6 of the external casing 2, is as follows. The bracket 9 is mounted in the cut-out 6, with its base 12 pressed against the upstream end 14 of the cut-out 6 and its shoulder 15 pressed against the inside surface of the external casing 2, upstream of the cut-out 6. The lugs 19, 19' are in contact with the outer face of the external casing 2, attached to the latter by screws in their bores 20, 20'.

In order to provide continuity for the gutter channel 7 of the external casing 2, the gasket support sector 11 is fixed to the bracket 9 by the screws 27, 27', that pass in the bores 18, 18' of the bracket 9 through the bores 26, 26' of the gasket support sector 11. The upstream face 16 of the projection 23, and its fingers 24, 24', are then pressed against the downstream face and the outer face of the elastomer gasket 10, and there is continuity between the two. In this configuration, the gutter channel 22 of the gasket support sector 11 provides continuity for the gutter channel 7 of the external casing 2.

Thus mounted, the bracket 9, the elastomer gasket 10 and the gasket support sector 11 provide continuity for the external casing 2, with the ancillary-connection passage block 8 being used to provide passage of the ancillary connections through the external casing 2, while holding them to each other according to the distribution of the channels 16 on the elastomer gasket 10. The block 8 also provides sealing for the assembly, since the ancillary connections are inserted by force into their channels 16.

The distribution box 30 for the ancillary connections 29 is fixed to the radial arm 3 and to the internal annular device 37 supporting the shell 4, by the screws 35, 36 of its fixing wall 34a' and of its upstream wall 34a, respectively. Its outer wall 32 is then located just inside the level of the shell 4. A fairing support 48 is then mounted so as to top the box 30. This fairing support 48 is fitted in order to extend the shape of the shell 4 and to provide it with continuity. It is formed so as to be fire-resistant and, for example, is fixed to the shell 4 by nuts and bolts. It includes a cut-out 49 bordered by a shoulder 50 which is attached to the shoulder 40 of the box 30 by securing resources 51 that are provided for this purpose. Here, this shoulder 50 is of pointed oval shape. The securing resources 51 are arranged so as to form a fire-resistant gasket between the box 30 and the fairing support 48.

A radial arm cover 52, for protection of the ancillary connections 29, is mounted on the fairing support 48, the radial arm 3 and the bracket 9 of the ancillary-connection passage block 8. This arm cover 52 takes the form of a steel plate matched to all of these elements that it covers, in order to protect the ancillary connections 29 of the monoblock arm 28. Its section is generally constant over its radial height and corresponds to the outline of the shoulder 50 of the fairing support 48. The arm cover 52 tops off this shoulder 50, the shoulders provided on the fixing wall 34*a*' of the box and the downstream surface of the radial arm 3 and the branches 13, 13' of the bracket 9 of the passage block 8. The arm cover 52 is fitted to complete the shape of the radial arm 3 with the aim of guiding the stream of secondary air flowing between the external casing 2 and the shell 4. Its shape is designed for the dynamic stresses which are imposed upon the flow, and based on parameters mainly associated with the mechanics of the fluids. The arm cover 52 is formed so as to be fire-resistant and is secured with nuts and bolts.

When all of these elements have been mounted, the result is a connection for the ancillaries between the outside of the external casing of the intermediate casing 2 and the inside of the shell 4, by means of the monoblock arm 28, parallel and downstream of the radial arm 3. The gasket support sector 11, the fairing support 48 and the arm cover 52 perform the function of continuity of the external casing 2, of the shell 4 and of the radial arm 3, in order not to impede the flow of secondary air.

Mounting the ancillary connection is a rapid process, since the arm 28 is mounted on a block, and it then remains only to mount the three continuity elements mentioned above. The saving of time on the assembly line of the engine 1 is therefore considerable. Moreover, accessibility is enhanced, and allows maintenance costs to be reduced. In addition, the links by continuous welding between the various elements of the box 30, the nipples 43 and the ancillary connections 29, provide the box 30 with resistance to fire, which is therefore a fire-resistant box as well as being an ancillary-connection distribution box 29. To this end, the various elements of the monoblock arm 28 can be in stainless steel. The fairing support 48 and the arm cover 52 also perform a fire-resistance function.

The turbofan jet engine of the invention has been described in association with the nipples 43 entering only via the lateral faces of the box 30, but it goes without saying that some nipples could open onto its inside surface 33.

The invention claimed is:

1. A turbofan jet engine, comprising:
   an external casing connected by radial arms to an annular internal device, downstream of which is mounted, opposite to the external casing, a shell forming a fairing, ancillaries on an outside of the external casing, ancillaries on an inside of the shell,
   a monoblock arm for the connection of ancillaries between the outside of the external casing and the inside of the shell, wherein said monoblock is placed parallel to one of said radial arms, wherein the monoblock arm includes ancillary connections between the external casing and the shell, a block of ancillary-connection passages through the external casing, and a box for distribution of the ancillary connections, and
   a gasket support sector to provide continuity on the external casing downstream of the block employed for passage of the connections for ancillaries, an arm cover to cover the ancillary connections downstream of the radial arm, and a fairing support to cover the distribution box for the connection of ancillaries and provide continuity for the shell.

2. A turbofan jet engine according to claim 1, wherein the box is fire-resistant.

3. A turbofan jet engine according to claim 2, wherein nipples entering from the box and welded to the latter, are fixed to the ancillary connections.

4. A turbofan jet engine according to claim 3, wherein each nipple includes a collar, a nut, and a ferrule for connection to an ancillary, the nut being tightened on one side of the box and the collar welded on the other.

5. A turbofan jet engine according to claim 1, wherein said engine is a double-flow turbofan jet engine, wherein the external casing is the external casing of an intermediate casing, the radial arm is a structural radial arm of the intermediate casing, and the internal annular device is the internal annular device of the intermediate casing.

6. A turbofan jet engine according to claim 1, further comprising an engine core inside said shell, and wherein said ancillaries on the outside of the external casing are routed into said core through said external casing and through said shell via said monoblock arm.

7. A turbofan jet engine according to claim 6, wherein said monoblock arm extends radially from said external casing to said shell.

8. A turbofan jet engine according to claim 1, wherein said monoblock arm is removable as a block between the external casing and the shell.

* * * * *

UNITED STATES PATENT AND TRADEMARK OFFICE
CERTIFICATE OF CORRECTION

PATENT NO. : 7,661,272 B2 Page 1 of 1
APPLICATION NO. : 11/226384
DATED : February 16, 2010
INVENTOR(S) : Pierre Gagneux et al.

It is certified that error appears in the above-identified patent and that said Letters Patent is hereby corrected as shown below:

On the title page, Item (57), line 1 of the Abstract, change "easing" to --casing--.

Signed and Sealed this

First Day of June, 2010

David J. Kappos
*Director of the United States Patent and Trademark Office*